US008631235B2

(12) United States Patent
Hughes

(10) Patent No.: US 8,631,235 B2
(45) Date of Patent: Jan. 14, 2014

(54) SYSTEM AND METHOD FOR STORING DATA USING A VIRTUAL WORM FILE SYSTEM

(75) Inventor: James P. Hughes, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1267 days.

(21) Appl. No.: 11/835,752

(22) Filed: Aug. 8, 2007

(65) Prior Publication Data

US 2009/0044010 A1    Feb. 12, 2009

(51) Int. Cl.
*H04L 29/06* (2006.01)

(52) U.S. Cl.
USPC ............. 713/165; 713/178; 713/180; 726/26; 726/22; 711/163; 711/112

(58) Field of Classification Search
USPC .................. 713/165, 176–178; 726/7, 22–26
See application file for complete search history.

(56) References Cited

U.S. PATENT DOCUMENTS

| | | | |
|---|---|---|---|
| 4,575,827 A | 3/1986 | Kulakowski | |
| 4,827,462 A | 5/1989 | Flannagan et al. | |
| 5,119,291 A | 6/1992 | Flannagan et al. | |
| 5,369,532 A | 11/1994 | Dodt et al. | |
| 6,165,330 A | 12/2000 | Ohba | |
| 6,339,810 B1 | 1/2002 | Basham et al. | |
| 6,470,449 B1 * | 10/2002 | Blandford | 713/178 |
| 7,139,891 B1 * | 11/2006 | Apvrille et al. | 713/178 |
| 7,340,610 B1 * | 3/2008 | Yagawa | 713/178 |
| 7,366,834 B2 * | 4/2008 | McGovern et al. | 711/112 |
| 7,464,404 B2 * | 12/2008 | Carpenter et al. | 726/14 |
| 7,483,993 B2 * | 1/2009 | Nachenberg et al. | 709/229 |
| 7,519,824 B1 * | 4/2009 | Peyravian et al. | 713/178 |
| 7,793,093 B2 * | 9/2010 | Fujita et al. | 713/151 |
| 8,255,655 B2 * | 8/2012 | Yu et al. | 711/163 |
| 8,280,855 B2 * | 10/2012 | Bish et al. | 707/687 |
| 8,332,362 B2 * | 12/2012 | McGovern et al. | 707/661 |
| 2002/0035665 A1 | 3/2002 | Basham et al. | |
| 2002/0059172 A1 | 5/2002 | Muhlestein | |
| 2003/0126359 A1 | 7/2003 | Debiez et al. | |
| 2003/0126446 A1 * | 7/2003 | Debiez et al. | 713/178 |
| 2005/0251691 A1 * | 11/2005 | Haufe | 713/189 |
| 2006/0075245 A1 * | 4/2006 | Meier | 713/176 |
| 2006/0095795 A1 * | 5/2006 | Nakamura et al. | 713/193 |
| 2007/0103984 A1 * | 5/2007 | Kavuri et al. | 365/185.17 |
| 2007/0174565 A1 * | 7/2007 | Merrick et al. | 711/161 |
| 2008/0209261 A1 * | 8/2008 | Zhang et al. | 714/6 |

OTHER PUBLICATIONS

S Lakhshmanan, Responsive security for stored data, Sep. 2003, IEEE, vol. 14, pp. 1-11.*

* cited by examiner

*Primary Examiner* — Nathan Flynn
*Assistant Examiner* — Viral Lakhia
(74) *Attorney, Agent, or Firm* — Brooks Kushman P.C.

(57) ABSTRACT

A system and method for storing data in a virtual file system using write once read many (WORM) protection includes a WORM server in communication with one or more storage devices and a controller in communication with the WORM server. A first time stamping process for creating a first time stamp for a data object based on instructions applied by the controller for storage on the WORM server. A second time stamping process for creating a second time stamp for the data object for storage on the WORM server. The second time stamping process creates the second time stamp for the data object and first time stamp to ensure the integrity of the data object stored on the system.

13 Claims, 4 Drawing Sheets

SYSTEM AND METHOD FOR STORING DATA USING A VIRTUAL WORM FILE SYSTEM

BACKGROUND OF THE INVENTION

1. Field of the Invention

The present invention relates to a system and method for storing data in a virtual file system using write once read many (WORM) protection.

2. Background Art

Data storage systems are typically implemented to provide network-oriented environments as scalable and network-aware file systems that can satisfy both data storage requirements of individual systems and the data sharing requirements of workgroups and clusters of cooperative systems. One type of data storage system is a storage area network (SAN), which typically connects to a local area network (LAN) or other network through a server or servers. The server or servers are connected to storage devices within the SAN to allow remote clients to store/retrieve data to/from the storage devices.

Write once read many (WORM) technology is a data storage technology that allows information to be written to a medium only one time and prevents the data storage device from erasing, modifying, or overwriting the data. WORM media may come in various forms, including physical WORM media (P-WORM), factory precoded WORM provided on media (E-WORM) and software based WORM (S-WORM). WORM protection refers to the protection that prevents the user from erasing, modifying, or overwriting data on the WORM media once the data is written to the media.

Although WORM protection implementations that use either optical media, magnetic media or both have been used in applications that have been commercially successful, and provide some level of data security, data integrity and security can still lapse, including with some secure time reference for the recorded data. The lack of a secure time reference from the WORM protection system makes it possible to falsify dates of documents, allowing the falsified document to be written to the media using WORM protection without any secure time reference from the WORM protection system.

SUMMARY OF THE INVENTION

A system and method for storing data in a virtual file system using write once read many (WORM) protection includes a WORM server in communication with one or more storage devices and a controller in communication with the WORM server. A first time stamping process for creating a first time stamp for a data object based on instructions applied by the controller for storage on the WORM server.

The first time stamping process applies a hash function to the data object to create a hash value for use in a data digest based on the data object. A digital time stamping service includes a private key, a public key, and capable of generating a published time that is applied by the digital time stamping service with the hash value to create the first time stamp. The digital time stamping service creates a digital signature with the first stamp and the private key. The first time stamp and associated data object are stored on the WORM server.

A second time stamping process for creating a second time stamp for the data object for storage on the WORM server. The second time stamping process creates the second time stamp for the data object and first time stamp to ensure the integrity of the data object stored on the system. The WORM server is configured to write data objects to specified locations and prevent future writing of data objects to the specified locations.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENTS

Figure 1:
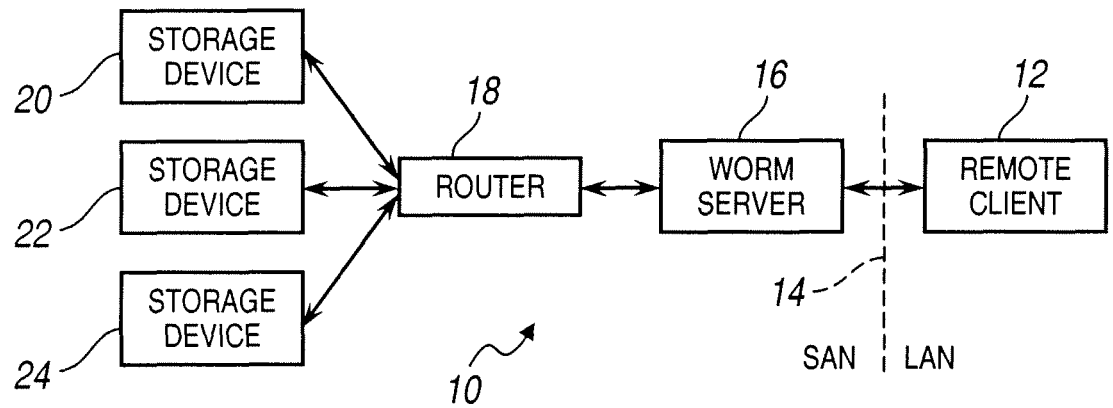
FIG. 1 is a block diagram illustrating a system and method for storing data with a virtual file system using write once read many (WORM) protection.

FIG. 1 illustrates an exemplary network architecture, generally referenced by number 10. It is understood that a variety of network configurations and components may be used to accomplish the same function. A remote client 12 is located on a local area network (LAN). Dashed line 14 shows the division between the storage area network (SAN) and the local area network (LAN). In the application illustrated, time stamped virtual WORM data is transferred in the network traffic for storage on a WORM server 16.

WORM server 16 sits between remote client 12 and a router 18. Multiple storage devices 20, 22, 24 may also be provided in communication with the router 18 for storage of data. Devices 20, 22, 24 may cooperate with or operate separately from the WORM server 16. FIG. 1 illustrates a simplified network architecture. However, it is understood that the architecture may include a number of remote clients, WORM servers, routers and/or storage devices connected thereto. WORM server 16 secures data and then forwards it to router 18.

When remote client 12 desires to write data to the network 10, the data is transmitted to WORM server 16 for processing. WORM server 16 applies the virtual WORM storage technique using the first and second time stamping processes to apply time stamps to the data, as will be described in greater detail below. The processed data, by way of time stamping is then written on the appropriate storage device. To read the data, WORM server 16 retrieves the associated time stamp information to verify data and time integrity to ensure that data has not been modified. If an error is detected in the data, server 16 may send a notification to the remote client 12.

Figure 2:
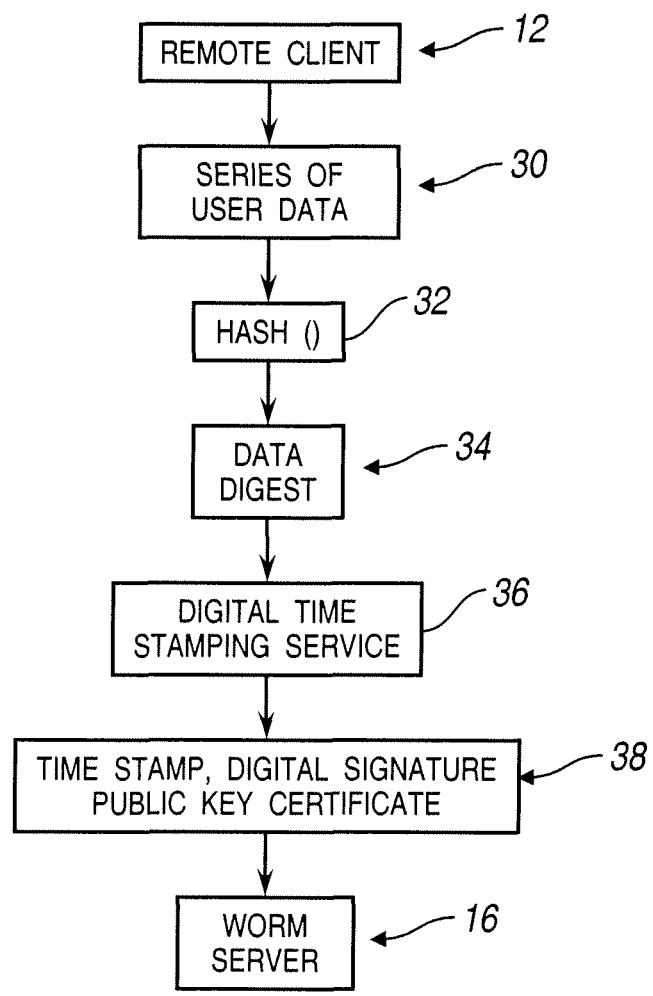
FIG. 2 is a block diagram illustrating creation and storage of a time stamp for a data object using the system and method.

FIG. 2 graphically illustrates operation of the virtual WORM file system using a first time stamping processes to apply a time storage to a data object. It is also understood that a second time stamping process may utilize one or more of the same functions to accomplish the intend purpose described below. Remote client 12 sends one or more data objects 30 to WORM server 16. User data 30 is processed by hash function 32 to produce a data digest 34. A hash function converts input from a data block into an output in a smaller set, commonly referred to as a hash value. A hash function is a function that maps an input of arbitrary finite bit length to an output of fixed bit length.

Hash functions are typically used to detect data tampering. Various hash processes differ in the domain of the respective input streams of the data blocks and the set of the respective output streams and in how patterns and similarities of input streams generate the respective output streams. Some examples of hash functions include the Secure Hash algorithm (SHA), the Message Digest algorithms, including MD4 and MD5, the Matyas-Myer-Oseas algorithm, and the like. It is understood that the system described herein can apply various hash functions and allows the hash function to be updated. The hash may be generated using any appropriate algorithm to meet the design criteria of a particular application.

Hash functions have a number of general uses. A cryptographic hash function is used in the security field to achieve data integrity. A cryptographic hash function is a one-way function that digests input data and has very few collisions. A one-way function is a function that is very difficult to invert, such that data can be processed through the one-way hash function to get a result, but it is very difficult to reverse the function and obtain the data with the result.

An existing data integrity check method using a cryptographic hash function involves the following. First, a data block or sequence of data blocks is received. The data is hashed using a cryptographic hash function or hash algorithm. Both the data and the hash are stored. It is understood that the hash may be small compared to the data because the cryptographic hash function digests the data. For example, many pages of text may be digested by a cryptographic hash function to produce a 20 byte hash. In addition, a cryptographic hash function has very few collisions in that two different initial texts have very little chance of producing the same hash.

It is appreciated that the above description of a hash function, a cryptographic hash function, and a data integrity check method to be discussed below are presented as a suitable technique for determining the message digest at block 34. The data blocks and associated hashes are stored on the system. At block 36, a digital time stamping service is established. At block 38, the digital time stamping service establishes a published time and creates the last block hash value as a secure time stamp in the digest to create a modified digital time stamp for storage on the system and reference by the system. The time stamp and associated data object are transmitted to the WORM server to be written thereon.

Figure 3:
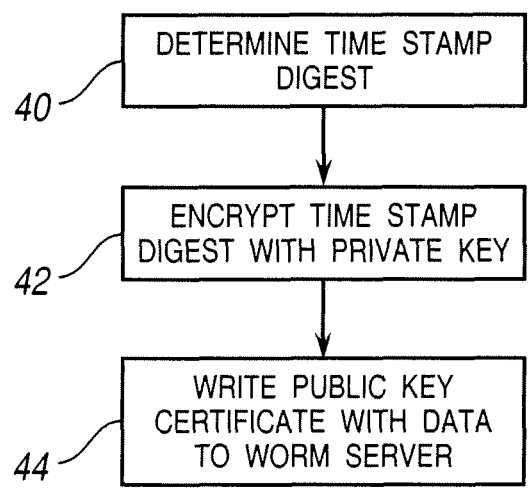
FIG. 3 is a block diagram illustrating the encryption of a data object with time stamp encryption information.

Referring now to FIG. 3, the digital time stamping service illustrated by block 38 in FIG. 2 is described in greater detail. At block 40, the data digest created by the hash function is evaluated. At block 42, the digital time stamping service establishes a private key and public key, and is capable of generating a published time. A time clock is used to produce a time value that is combined with the hash value to produce a value. The time stamp is digitally signed with the digital time stamping service private key to create a digital signature. Because the private key is kept secret, the digital signature cannot be forged.

At block 44, the public key or public key certificate is written to the WORM server and/or storage medium with the data object for storage. Digital signing a collection of data as described above may include taking the digest of the data and encrypting the digest with the private key. The encrypted digest is the digital signature of the data. A digital signature serves to authenticate that data was produced by a proper party, since only the proper party will know the correct code with which to create an authentic signature. Some examples of existing digital signature schemes in the art include the Rivest-Shamir-Adleman digital signature scheme, the Fiat-Shamir signature scheme, and the Digital Signature Algorithm (DSA). It is understood that the system allows for the upgrading of digital signature algorithms, many different digital signature algorithms may be used in the present invention, including algorithms that have not yet been developed.

Accordingly, when data is stored together with the digital signature of the data, the digital signature allows both authenticity and integrity to be checked. Using the public key to decrypt the encrypted digest authenticates that the digest was encrypted with the private key of the key pair and thus was signed by the owner of the private key. It is understood that the public key may be widely distributed so that it does not have to be returned by digital time stamping service. The private key is kept secret. Because the private key is kept secret, the digital signature cannot be forged.

The digital time stamping service may rely on an external trusted source or may rely on a trusted internal time source. Further, the digital time stamping service may be contained within WORM server or may be stored on a separate storage medium. When reading the data back from storage, the time stamp and digital signature may be used to determine data integrity and time stamp authenticity. As discussed above, the message, the time stamp, and the digital signature are stored to the medium using write once read many (WORM) protection.

Public key encryption uses a pair of asymmetric keys for encryption and decryption. The private key is kept protected, while the public key is made available to the public. Data that is encrypted with the public key can be decrypted only with the private key. Data encrypted with the private key can be decrypted only with the public key. As such, because the time stamp is digitally signed with the digital time stamping service private key, the encrypted information can be decrypted only with the public key. In addition, when decryption with the public key produces meaningful information, the information must have been encrypted with the private key.

Figure 4:
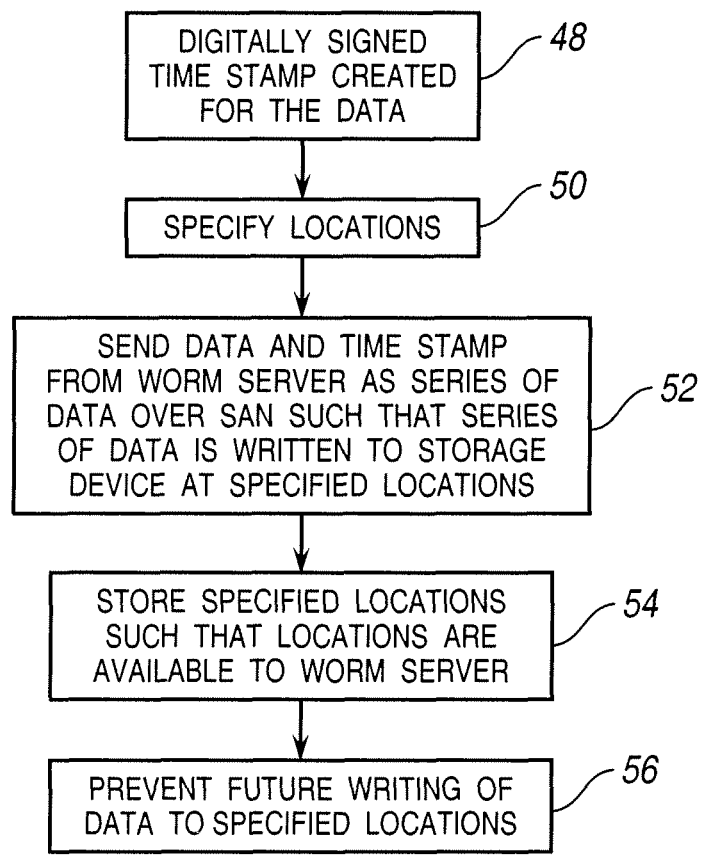
FIG. 4 is a block diagram illustrating storage of the data object on the system.

FIG. 4 illustrates the method of amending the time stamp in the system. At block 48, a digitally signed time stamp is created for the data. The time stamp may contain the time t at which the time stamp was created and a hash value for the data at time t. This hash value can be compared with a stored hash value for the data to determine if the data has been modified since time t. The time stamp may also be signed with a digital signature. This means that the time stamp data, the time value t and the hash value, came from an authentic source. At block 50, storage locations on the system for the data with the digitally signed time stamp are specified. At block 52, the data and the digitally signed time stamp are sent from the WORM server to the storage device as a series of data blocks such that the series of data is written to the storage device at the specified plurality of storage locations. The specified locations are stored at block 54. The locations of the stored data are available to the WORM server.

Storing the specified locations allows the WORM server to prevent future writing of data to previously specified locations as shown in block 56. It is understood that the WORM server implements an overwriting prevention feature or virtual WORM protection such that whenever data is processed in the WORM server, its storage location is memorized so that it is never possible to overwrite that location, that is, to provide virtual WORM protection.

For a sequential access block device, a last specified block number may be stored or memorized to prevent future writing of data to already used blocks. For a random access block device, all specified block numbers are stored to prevent writing of data to previously used block numbers such that the WORM server keeps track of storage locations as locations are specified for writing data to them. The WORM server makes sure that once any particular location has been written to, that the future writing of data to that particular location is prevented.

In one application, the data may be written once to the WORM server and/or storage medium on the system, read many times from the storage medium, but not erased, modified, or overwritten. The system may include a controller in communication with a program medium having instructions stored thereon that are executable by the controller to perform the time stamping. The digital time stamping service is established with a private key and a public key and is capable of generating a published time. The published time from the digital time stamping service is written to the data digest to create a time stamp. The time stamp is digitally signed with the digital time stamping service private key. Further, the message, the time stamp, and the digital signature are stored to the storage medium and/or the WORM server using write once read many (WORM) protection.

Digitally signing the time stamp with the digital time stamping service includes determination of a time stamp digest and encrypting the time stamp digest with the digital time stamping service private key. The time stamp digest may based on the time stamp. Digests such as the message digest and the time stamp digest are determined with a suitable hash function. The program medium instructions are further executable by the controller to store the digital time stamping service public key to the medium using write once read many (WORM) protection. It is understood that the digital time stamping service has a public key certificate and the instructions are further executable by the processor to store the digital time stamping service public key certificate to the medium using write once read many (WORM) protection.

Figure 5:
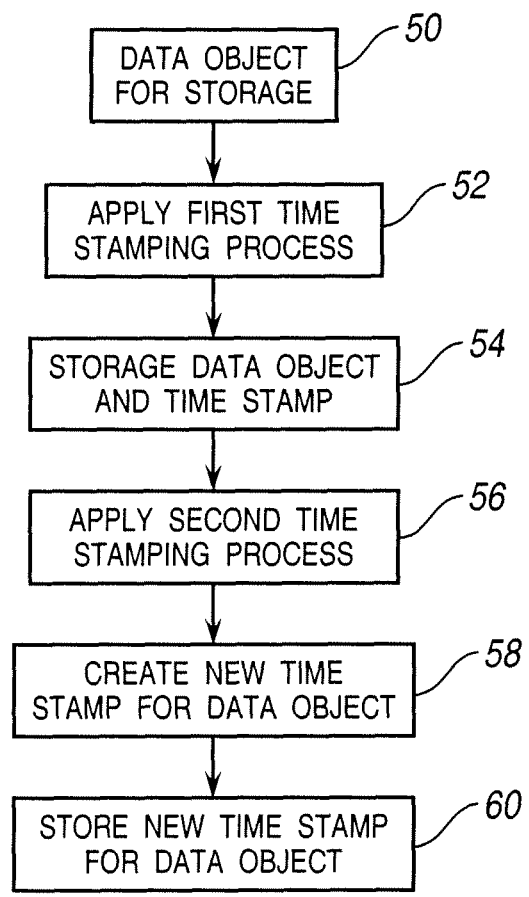
FIG. 5 is a block diagram illustrating application of first and second time stamping processes using the system and method.

Referring now to FIG. 5, an implementation of a method of storing data on a virtual file system using write once read many (WORM) protection is described in greater detail. At block 50, data objects are presented and written to the storage medium of the file system for storage thereon. Data objects written to the WORM server may be written once to the medium, read many times from the medium, but not erased, modified, or overwritten.

At block 52, system applies a first time stamping process using the methods described above to apply a first data stamp for all files stored in a particular data structure or data tree. Thus, the process generates a message for each file stored on the storage medium, creates a data digest based on the data object. The process writes the published time generated by the digital time stamping service to the data digest to create a time stamp, and digitally signing the time stamp with the digital time stamping service private key.

The data object and associate first time stamp are stored to the WORM server and/or storage devices using write once read many (WORM) protection. This process can be conducted on an as needed basis or conducted at discrete time intervals to ensure the integrity of the data stored on the storage medium and to create a reference point for application of the second time stamping process. Upon completion of the first time stamping process at block 54, a new file is created that contains the hashes of files stored on the system that is used for evaluation of data integrity. The WORM server is configured to send the data and the created digitally signed time stamp to the storage device such that the data and time stamp are written to the storage device at the specified plurality of locations. The WORM server prevents future writing of data to the specified plurality of locations.

At block 56, a second time stamping process is applied to new items presented for storage to the WORM server and items currently stored on the WORM server and/or storage devices. The second time stamping process at block 58 conducts a hash of the new data objects and previously stored time stamps to create the representative data digest for evaluation by the digital time stamping service.

The digital time stamping service creates a second time stamp and digitally signs the file to create an incremental value for storage on the tree as described above. In another application, the second time stamping process executes a hash function on a previously created time stamp to produce a new hash value. The hash value may be processes with an updated digital signature algorithm to produce digital signature. The hash value and digital signature are then combined to produce a new time stamp to be recorded along with existing time stamp.

In another application, a data object is directly encoded by the second time stamping process using a new or updated hash function to produce a hash value. The hash value is combined with a time value to produce a digital signature. The digital signature is combined with the hash value to create a digitally signed time stamp that is appended to the data object for storage.

At block 60, the second time stamping process incorporates the time stamps previously created by the first time stamping process and creates a new time stamp for the data object. Creation of a new time stamp ensures data integrity by replacing the previously stored values that may be subject to degradation due to weakening of the cryptographic algorithm with reference values created with the most current cryptographic algorithm to not only the newly created data object, but to all files stored on the data storage system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for storing data on a virtual file system using write once read many (WORM) protection, the system comprising:
   a WORM server in communication with one or more storage devices;
   a controller in communication with the WORM server;
   a first time stamping process for creating a first time stamp for a data object based on instructions applied by the controller for storage on the WORM server; and
   a second time stamping process for creating a second time stamp for the data object for storage on the WORM server, including:
     executing a hash function on a previously created time stamp to produce a new hash value;
     processing the new hash value with a digital signature algorithm different from a digital signature algorithm previously used to process a previously produced hash value with respect to the previously created time stamp, to produce a digital signature; and
     combining the digital signature and hash value to produce a new time stamp to be recorded along with the previously created time stamp.

2. The system of claim 1 wherein the WORM server is configured to receive data objects from a remote client for storage thereon.

3. The system of claim 2 wherein the WORM server is configured to write data objects to specified locations and prevent future writing of data objects to the specified locations.

4. The system of claim 1 wherein the first time stamping process includes:
   applying a hash function to the data object to create a hash value for use in a data digest based on the data object;
   establishing a digital time stamping service having a private key, a public key, and capable of generating a published time;
   applying the published time from the digital time stamping service with the hash value to create the first time stamp;
   digitally signing the timestamp with the digital time stamping service private key to create a digital signature for use with the first stamp; and
   storing the first time stamp and associated data object on the WORM server.

5. The first time stamping process of claim 4 wherein digitally signing the first time stamp further comprises:
   computing the digital signature using the first time stamp; and
   encrypting the time stamp digest with the digital time stamping service private key.

6. The system of claim 4 wherein the first time stamping process is configured to store the digital time stamping service public key with the data object on the WORM server.

7. The system of claim 6 wherein the digital time stamping service includes a public key certificate for reading the data object and associated first time stamp incorporating the private key.

8. A method of storing data on a virtual file system using write once read many (WORM) protection, the method comprising:
   providing a write once read many (WORM) server in communication with one or more storage devices;
   receiving a data object at the WORM server from a remote client;
   computing a first time stamp for the data object with a first time stamping process for storage on the WORM server; and
   computing a second time stamp for the data object with a second time stamping process for storage on the WORM server,
   wherein the second time stamping process creates the second time stamp for the data object, including:
   executing a hash function on a previously created time stamp to produce a new hash value;
   processing the new hash value with a digital signature algorithm different from a digital signature algorithm previously used to process a previously produced hash value with respect to the previously created time stamp, to produce a digital signature; and
   combining the digital signature and hash value to produce a new time stamp to be recorded along with the previously created time stamp.

9. The method of claim 8 further comprising the step of writing the data objects and associated first and second time stamps to specified locations to prevent future writing of data objects to the specified locations.

10. The method of claim 8 wherein computing the first time stamping further comprises:
    applying a hash function to the data object to create a hash value for use in a data digest based on the data object;
    establishing a digital time stamping service having a private key, a public key, and capable of generating a published time;
    applying the published time from the digital time stamping service with the hash value to create the first time stamp;
    digitally signing the timestamp with the digital time stamping service private key to create a digital signature for use with the first stamp; and
    storing the first time stamp and associated data object on the WORM server.

11. The method of claim 10 wherein digitally signing the first time stamp further comprises:
    computing the digital signature using the first time stamp; and
    encrypting the time stamp digest with the digital time stamping service private key.

12. The method of claim 11 further comprising the step of storing the digital time stamping service public key with the data object on the WORM server with the first time stamping process.

13. The method of claim 12 further comprising the step of providing a public key certificate for reading the data object and associated first time stamp incorporating the private key with the digital time stamping service.

* * * * *